United States Patent
King et al.

(10) Patent No.: US 7,631,337 B2
(45) Date of Patent: Dec. 8, 2009

(54) KVM VIDEO AND OSD SWITCH

(75) Inventors: Randy J. King, Rochester, NY (US); Parker J. Voll, Rochester, NY (US)

(73) Assignee: Belkin International, Inc., Compton, CA (US)

( * ) Notice: Subject to any disclaimer, the term of this patent is extended or adjusted under 35 U.S.C. 154(b) by 337 days.

(21) Appl. No.: 11/592,048

(22) Filed: Nov. 1, 2006

(65) Prior Publication Data

US 2007/0079348 A1    Apr. 5, 2007

Related U.S. Application Data

(63) Continuation of application No. 10/038,998, filed on Jan. 5, 2002, now abandoned.

(51) Int. Cl.
*H04N 7/16* (2006.01)
*G09G 5/02* (2006.01)
*G09G 5/00* (2006.01)
*H04B 1/28* (2006.01)

(52) U.S. Cl. ............... 725/141; 345/698; 345/156; 455/333

(58) Field of Classification Search ........... 725/141; 345/698, 156; 455/333
See application file for complete search history.

(56) References Cited

U.S. PATENT DOCUMENTS

| | | | | |
|---|---|---|---|---|
| 4,851,796 | A | * | 7/1989 | Hendriks ............. 333/129 |
| 4,937,865 | A | * | 6/1990 | Barany ............... 380/242 |
| 5,257,411 | A | * | 10/1993 | Minasi ................. 455/80 |
| 5,353,033 | A | * | 10/1994 | Newberg et al. ...... 342/375 |
| 5,442,340 | A | * | 8/1995 | Dykema ........... 340/825.22 |
| 5,598,110 | A | * | 1/1997 | Chang ................ 326/60 |
| 5,793,300 | A | * | 8/1998 | Suman et al. ...... 340/825.22 |
| 6,208,875 | B1 | * | 3/2001 | Damgaard et al. ..... 455/552.1 |
| 7,123,898 | B2 | * | 10/2006 | Burgener et al. ......... 455/333 |

* cited by examiner

*Primary Examiner*—Hoang-Vu A Nguyen-Ba
(74) *Attorney, Agent, or Firm*—Bryan Cave LLP

(57) ABSTRACT

A high speed video switch in a KVM system using discrete Radio Frequency (RF) switch circuits. The RF switch circuits are configured into a multiplexed circuit to route video signals from a selected host computer to a target monitor. Voltage converters are used to provide control signals of the proper voltage to the RF switch circuits. Peaking operational amplifiers are used to compensate for the roll-off effect caused by the video connectors. An On Screen Display (OSD) switch using the RF switches is used to rapidly switch between the OSD data and host computer video for display to the target operator control center monitor.

20 Claims, 6 Drawing Sheets

KVM VIDEO AND OSD SWITCH

CROSS-REFERENCE TO RELATED APPLICATION

This application is a continuation of U.S. patent application Ser. No. 10/038,998, filed Jan. 5, 2002, which is incorporated by reference herein.

BACKGROUND

The acronym "KVM" stands for Keyboard, Video and Mouse. This represents a class of switching systems designed to provide user(s) centralized control and monitoring of multiple computers ("host computers") from a single keyboard, monitor and mouse ("operator control center" or "OCC"). The OCC may be located remotely from the host computers. A KVM system works by allowing the user to select a host computer to monitor and control from the OCC. The user may select the host from an interface displayed on the OCC monitor (the "On Screen Display" or "OSD") or from controls located on the front panel of the KVM unit. The KVM system switches the video signals of the selected host computer to the OCC monitor so that the user may view the host video from the OCC. The KVM system also routes or "switches" the Keyboard and Mouse signals of the OCC to the respective ports of the selected host computer. From the host computer's perspective, it appears as if the OCC's keyboard and mouse are directly attached to the host.

Users of KVM systems include system administrators, developers, software or hardware engineers, technicians, graphic artists, etc. Examples of tasks that are commonly performed with KVM systems include monitoring applications that are running on the host computers, installing or upgrading software applications or programs, and re-booting the host computers. KVM systems are commonly used by Internet Service Providers (ISPs). ISPs require a large number of computers or "server farms" to handle the large volume of Internet traffic and data. ISPs use KVM systems to provide centralized oversight over the server farms, thereby reducing the burden of computer maintenance and administration.

KVM systems are also used in distributed processing where applications are run using the processing power of a number of interconnected computers. For example, it is becoming increasingly popular to use computer generated images for animation and special effects in movies. Computer graphics of this kind entail a large amount of intensive calculations and often require more processing power than is available from any one computer standing alone. In order to enhance processing power and speed, tasks are distributed over a number of host computers. KVM systems allow for control and monitoring of these computers from a single OCC.

The benefits provided by KVM systems include the time saved by eliminating the need to travel from host to host to monitor or operate each host computer. In addition, the keyboards, monitors and mice of the host computers are no longer needed and can be eliminated, thereby saving money and space.

The performance demands of a KVM system for switching video data has increased with the increase in monitor resolution. The higher the monitor resolution, the higher the processing speed required by the KVM system to deliver the video signals to the OCC display without degradation. The approximate speed required by a KVM video switch for a given resolution can be estimated as follows: ((number of horizontal pixels)×(number of vertical pixel lines)×(85 Hz refresh rate of 85 images per second))×(1.45 factor to allow time for vertical and horizontal retrace). Conventional KVM systems, operating at speeds of 250 MHz or less, are sufficient to accommodate many but not all standard monitor resolutions. Those resolutions that may be accommodated by conventional KVM systems include VGA (640 ×480 pixels), SVGA (800×600 pixels), XGA (1,024×768 pixels), and SXGA (1,280×1,024 pixels). For example, SXGA requires a processing speed of approximately (1,280×1,024)×85 Hz×1.45, which is approximately 162 MHz, and is less than 250 MHz.

Video displays under the QXGA image resolution standard of 2048×1536 pixels (3,143,728 pixels) and higher, however, are required to function at speeds approximating 400 MHz. Using the formula described above, the approximate speed required for the QXGA resolution is 388 MHz, which is (2048×1536)×85 Hz×1.45. Conventional KVM systems, operating at speeds of 250 MHz or less, are therefore unsuitable for higher resolution video.

Conventional KVM systems are limited to speeds of less than 250 MHz for several reasons. One reason is that the circuitry used by conventional KVM systems to implement the video switches is inadequate. The types of video circuitry used by conventional KVM video switches are either Resistor-Transistor Logic (RTL) or Large-Scale Integration (LSI) circuits.

KVM systems using RTL circuitry are comprised of resistors and bipolar transistors. The RTL implementation requires a large number of the resistor and bipolar-transistor components and therefore consuming a large portion of the limited space available on the printed circuit board (PCB) of the KVM unit. The large number of components required for an RTL switch also makes these switches difficult to assemble. For the above reasons, RTL switches are undesirable at the speeds required by higher resolution video standards such as QXGA.

The other type of circuits used in conventional KVM systems are LSI circuits, which are circuits having a large number of electronic components integrated on a single chip. For example, U.S. Pat. No. 5,884,096, Beasley et al., utilizes LSIs. See, e.g., Col. 8, Lines 11-28. LSIs, however, are in extremely limited supply at speeds above 200 to 250 MHz. Implementing a KVM system using LSIs at speeds near 400 MHz would be prohibitively expensive.

Another factor inhibiting the use of high speed video in KVM systems is the problem of video degradation caused by the "roll-off" effect. The roll-off effect refers to a decrease in the amplitude of a signal as the frequency of the signal increases. This effect is caused by the impedance of the conventional connectors, such as DB-25 connectors, through which the analog video signals pass as they travel through the KVM system. The roll-off effect is significant in video applications operating at speeds above 250 MHz and causes attenuation of video signals at the higher operating speeds. To the user, the resulting image appears "soft", i.e., having non-crisp edges, color aberrations, and generally blurred text characters. Therefore, the roll-off effect poses an additional problem for high speed video KVM systems.

KVM systems may be controlled from a set of controls located on the front panel of the KVM unit, from keyboard sequences or "hot keys", and/or from an On Screen Display ("OSD"). The OSD is an interface displayed on the monitor of the OCC to allow the user to control the KVM system. The OSD is typically more convenient and offers more features than the other means of control. The OSD may be text based or graphics based. Conventional KVM systems present the OSD to the OCC monitor using summing operational amplifiers to "add" or sum the OSD video data "on top of" the video data originating from the host computer. This creates a transparent effect where the host computer video appears as a background to the characters of the OSD text or banners. For a display having a transparent background, the OSD may be difficult to read if there is insufficient contrast between the OSD characters and the background host computer video. In addition, the transparent effect created by the summing of the OSD video on top of the host video is inconsistent with the look and feel of most modem operating systems, in which windows are typically displayed with an opaque background.

SUMMARY

The present invention is directed to a high speed video switch in a KVM system using discrete Radio Frequency (RF) switch circuits. As recognized by the present invention, the extremely low capacitance, high isolation, fast switching speed, and low cost characteristics of the RF devices make them ideal for use in combination as a video multiplexer switching device. RF switches are configured into a multiplexed circuit in combination with output enable/disable high-speed video operational amplifiers to route video signals from a selected host computer to a target monitor. Video connector roll-off is compensated by utilizing a peaking operational amplifying circuit to emphasize the video signals of effected frequencies before display to the target monitor. In accordance with one aspect of the present invention, an OSD switch using the RF switches is used to rapidly switch between OSD data and host computer video data for display to the OCC monitor. With this technique, the host computer video is completely switched off and effectively removed from the portion of the computer screen where the OSD is displayed to the user. Video rates of up to 2048×1536 resolution at approximately 85 Hertz (QXGA) are supported while maintaining a quality video image.

DRAWINGS

These and other features, aspects, and advantages of the present invention will become better understood with regard to the following description, appended claims, and accompanying drawings where:

DESCRIPTION

Figure 1:
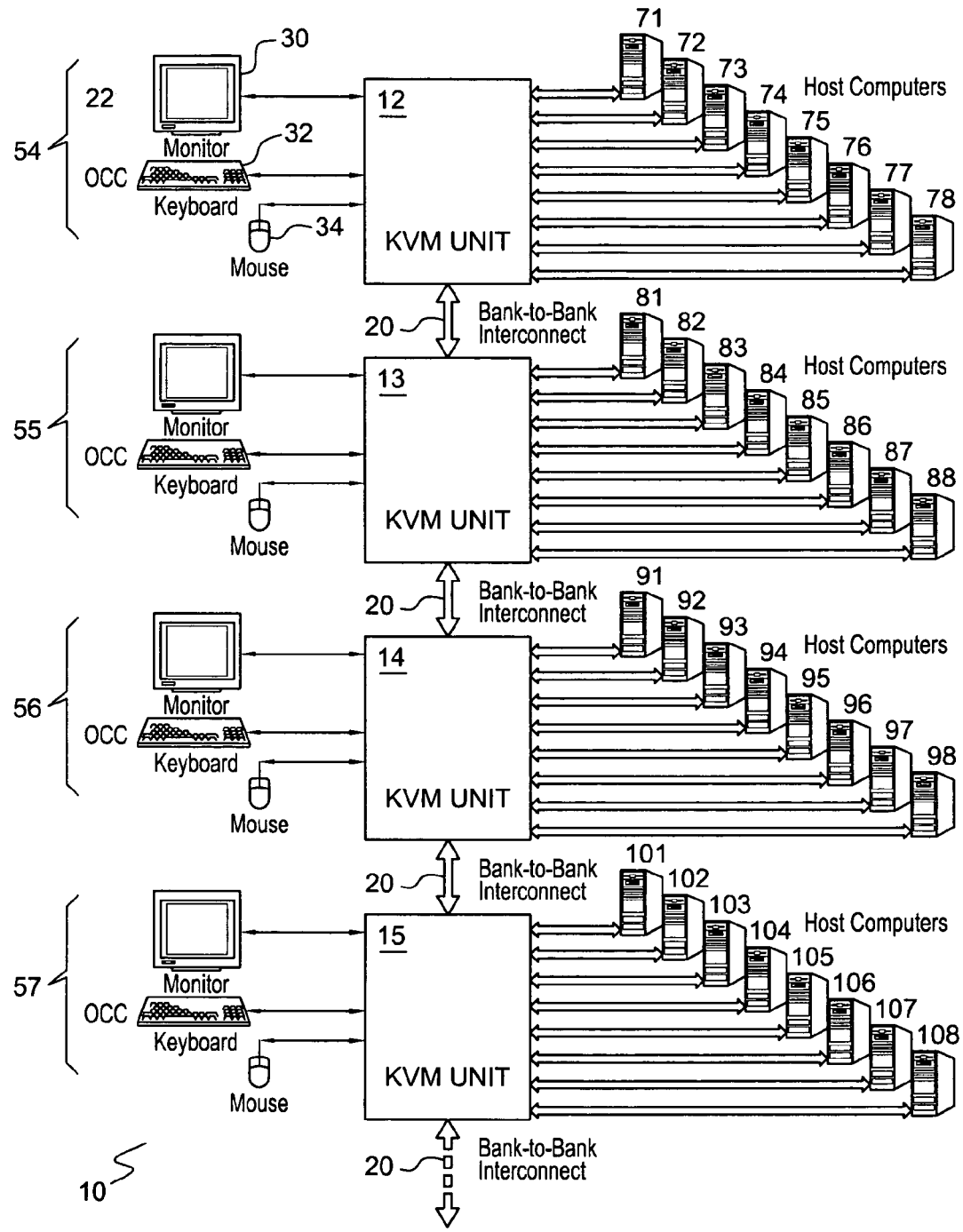
FIG. 1 shows a schematic drawing of a KVM system employing the novel video and OSD switch of the present invention.

FIG. 1 shows a schematic drawing of a KVM system 10 employing the novel video switch of the present invention. The system of FIG. 1 depicts four KVM units 12-15 daisy-chained together by a bank-to-bank interconnect 20. Referring to the first KVM unit 12, an Operator Control Center ("OCC") 22 and eight (8) host computers 71-78 are connected to the KVM unit 12. A KVM unit 12 along with its connected host computers 71-78 and OCC 22 are collectively referred to as a bank 54. Several banks 54-57 chained together are collectively referred to as a cluster. As used herein, the terms "KVM system" and cluster are synonymous and are used interchangeably.

Although the system 10o as shown depicts eight host computers 71-78 connected to a KVM unit 12, alternate embodiments of the KVM system 10 may have connections for fewer or more host computers per KVM unit 12. For example, conventional KVM systems commonly allow between 2 to 16 host computers per KVM unit.

The host computers 71-78, 81-88, 91-98, 101-108 may be any type of conventional computer having peripheral devices and video ports. For example, a host computer 71 may be a server (web server, e-mail server, database server, application server, etc.), personal computer, or laptop. A host computer 71 may have PS/2 keyboard and mouse ports and/or USB ports. A host computer 71 is preferably connected to a KVM unit 12 by an octopus cable connection, although any suitable connection may be used. In addition, a host computer 71 may operate any operating system (e.g., Windows, Macintosh, Linux, etc.).

An OCC 22 includes a keyboard 32, monitor 30 and mouse device 34. As used herein, the term "mouse" refers to any cursor control device. The OCC keyboard 32 and mouse 34 devices may be PS/2 devices or USB devices or a combination of both. For example, it is possible to simultaneously attach both a PS/2 keyboard and a USB mouse. Because the USB protocol allows multiple devices to be attached to a single USB port by using a commercially available device known as a USB hub, multiple PS/2 devices and USB devices may be attached to a KVM unit 12.

Although in FIG. 1 several KVM units 12-15 are shown chained together, a single KVM unit 12 may be configured to operate as a KVM system 10 consisting of a single bank 54. Although only four (4) KVM units 12-15 are shown in FIG. 1, additional KVM units may be added to the chain via the bank-to-bank interconnect 20 of the first 12 or last 15 unit in the chain to form a larger cluster 10.

As described in further detail below, the number of OCCs per cluster is limited by the number of video busses in the system. The preferred embodiment uses four (4) video busses, thereby allowing up to four (4) OCCs per cluster. Alternate embodiments of the present invention may have fewer or more video busses, thereby permitting fewer or more OCCs.

FIG. 1 shows four (4) OCCs 54-57 attached to the cluster 10. This enables up to four users to operate the KVM system. Each of the four OCCs 54-57 may select any one of the thirty-two (32) host computers 71-78, 81-88, 91-98, and 101-108 for control from that particular OCC, regardless of whether the selected host computer is located on the same bank 54-57 as the OCC.

A KVM unit 12 is preferably housed in a robust metallic, rack mount and/or stackable desk configuration of an American National Standards Institute (ANSI) standard 1U size enclosure.

Figure 2:
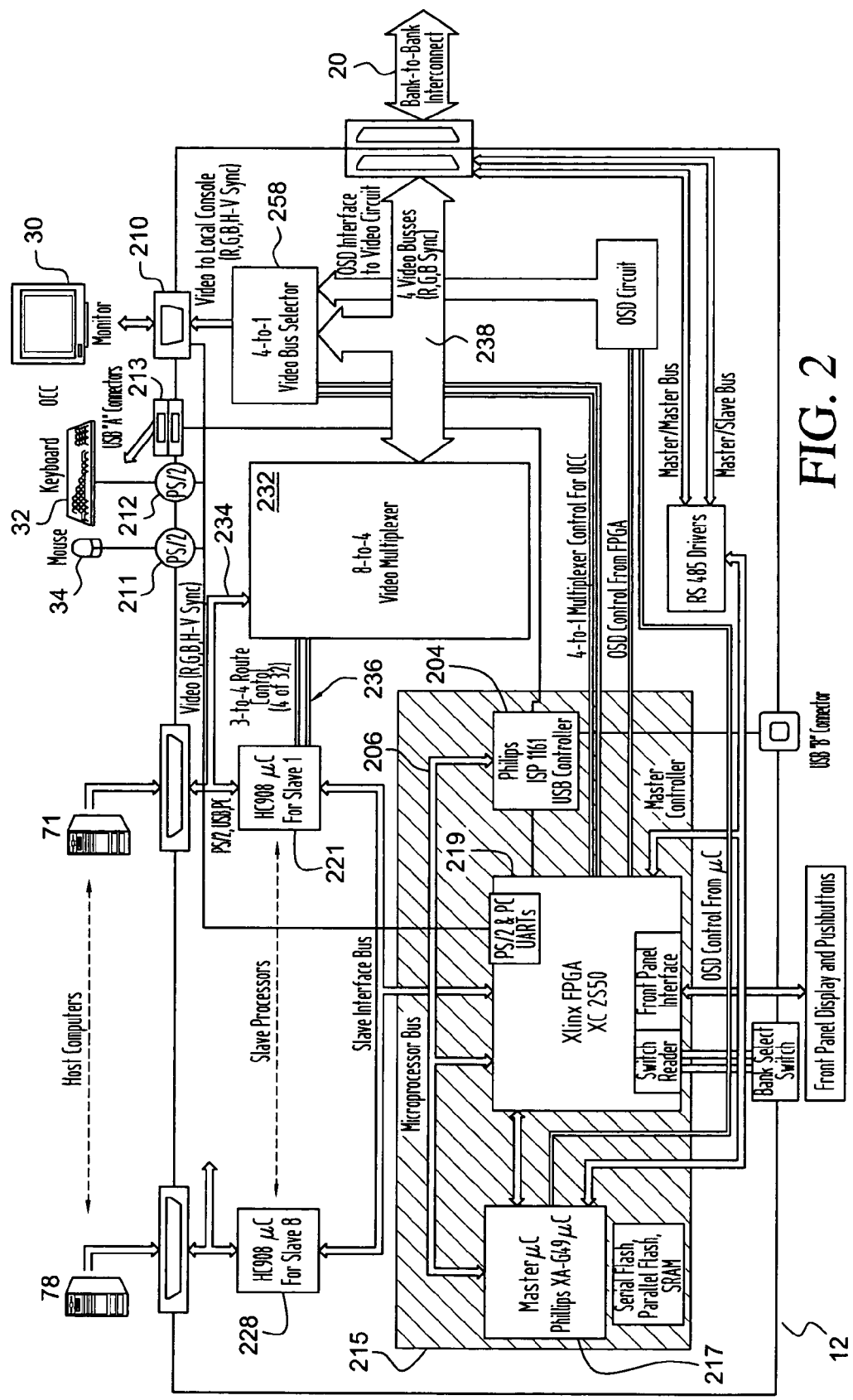
FIG. 2 shows a schematic drawing of an individual KVM unit of the KVM system of FIG. 1.

FIG. 2 shows a schematic drawing of a KVM unit 12 of FIG. 1. The KVM unit 12 includes video, PS/2, and USB A device ports 210-213, for connecting the OCC devices 30, 32 and 34. Power is supplied by the KVM unit to the USB A port 213 through resettable fuses (not shown).

The KVM unit 12 includes a master controller 215. In the preferred embodiment, the master controller 215 includes a microcontroller 217 coupled with a Field Programmable Gate Array (FPGA) 219. The microcontroller 217 is preferably a Philips XA-G49 C controller. The FPGA 219 is preferably a Xilinx FPGA XC2S50. The FPGA 219 expands the number of I/O ports available to the master controller 215. The master controller 215 includes PS/2 and I²C UARTs 202 implemented as part of the FPGA 219. The master controller 217 also includes a USB controller 204 for handling communications between USB devices and the master controller 215. Preferably, the USB controller 204 is a Phillips ISP 1161 USB controller. A microprocessor bus 206 connects the microcontroller 217, FPGA 219 and USB controller 204 within the master controller 215.

A KVM unit 12 also includes eight (8) slave controllers 221-228, only two of which are shown in FIG. 2. Each slave controller is dedicated to a host computer. For example, slave controller 221 in FIG. 2 is dedicated to host computer 71. A slave controller 221 preferably includes USB control hardware (not shown) for USB protocol communications with its host computer 71. In addition, a slave controller 221 can receive PS/2 data and I²C data from the host computer 71. The I²C data is used by the slave controller to communicate PnP (Plug and Play) information to the host computer 71.

Preferably, a slave controller 221 may receive power from the connected host computer 71 through the host computer connection when the KVM unit 12 is turned off. This enables the slave controller 221 to provide the necessary signals emulating the presence of an attached peripheral device to the host computer 71 even when the KVM unit 12 is turned off. This eliminates the error message that might otherwise occur if the host computer 71 were powered on when the KVM unit 12 was turned off.

The master controller 215 is connected to the slave controllers 221-228 by a slave interface bus 230, which is a parallel data bus. The master controller 215 can also communicate with the slave controllers of the other banks 54-57 in the system or cluster 10 through the master-slave communication bus 247, which is a serial bus, which is connected to other KVM units 13-15 in the cluster 10 through the bank-to-bank interconnect 20.

A KVM unit 12 also includes an 8×4 video multiplexer 232. The video outputs of each of the eight (8) host computers 71-78 are fed as input 234 to the 8×4 video multiplexer 232. FIG. 2 shows one 234 of the eight sets of video inputs into the 8×4 video multiplexer 232. Although the preferred embodiment has up eight (8) host computers 71-78 per KVM unit 12 and therefore uses a video multiplexer 232 having eight (8) video inputs 234, alternate embodiments may include fewer or more host computers and would have correspondingly fewer or more video inputs 234 into the video switch 232.

Each slave controller 221-228 has four control output signals 236 connected to the 8×4 video multiplexer 232. FIG. 2 shows the control outputs 236 for a slave controller 221. Each of the four control signals 236 corresponds to one of the four video busses 238 of the KVM system 10. The 8×4 video multiplexer 232 has four outputs, one output to each of the four video busses 238 of the preferred embodiment. Although the preferred embodiment uses four video busses 238, thereby allowing up to four OCCs 22-25 per cluster 10, alternate embodiments may use fewer or more video busses and have correspondingly fewer or more control signals 236 from each slave controller 234 to the video multiplexer 232.

Figure 3:
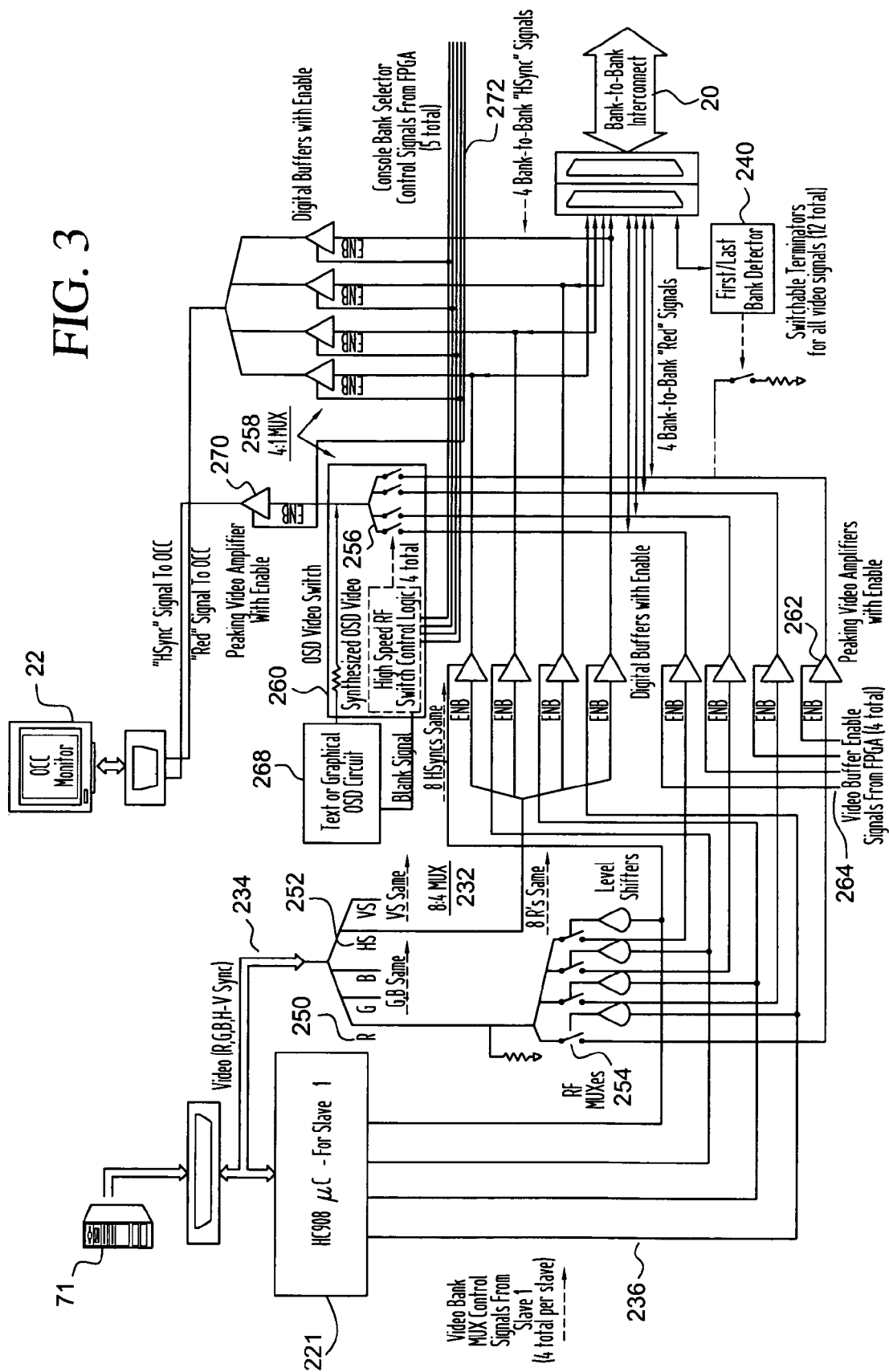
FIG. 3 shows a schematic drawing of the 8×4 video multiplexer and 4×1 Video Bus Selector of the KVM unit of FIG. 2.

FIG. 3 shows a schematic drawing of the 8×4 video multiplexer and 4×1 video bank selector of FIG. 2. Specifically, the multiplexer paths for the "Red" 250 and "HSync" 252 signals from the video of host computer 71 are shown. Discrete Radio Frequency (RF) cell phone switches 254 are configured into an 8×4 multiplexed circuit to route the video signals 234 of the selected host computer 71 to the target OCC monitor 22 and are also used in the 4×1 video bus selector 258 and high speed OSD switch 260. The RF switches 254, 256 are types of transistors normally used for switching RF signals in RF communications or television tuner circuits. Preferably, the type of discrete RF switch circuit used is of a depletion mode MOSFET (Metal Oxide Semiconductor Field-Effect Transistor) construction, such as the commercially available BF1107, BF1108, and BF1108R devices manufactured by Philips. As recognized by the present invention, the extremely low capacitance, high isolation, fast switching speed, and low cost characteristics of the discrete RF switches make them ideal for use in combination as a video multiplexer switching device in a KVM system 10. The low cost and small size of the discrete RF switches further allow for relatively large multiplexer switching arrays to be implemented while benefiting from the superior performance of discrete solutions, especially the high isolation and high frequency bandwidth parameters.

Tracing a single video signal "R" (Red), the R signal 250 is presented to four (4) discrete RF switches 254. The R signal 250 is switched by the RF switch circuits 254 onto one of the four video busses based on the "Host Video Select" signal 236 received from the slave controller 221.

The R signal 250 is then fed to the input of a peaking video amplifier 262 with an output enable function and is also enabled onto one of the four busses by the video buffer enable signals from the FPGA 219 of the master controller 215. This peaking video amplifier circuit 262 acts as a buffer, driver and an amplifier at frequencies from 80 MHz to ~2 db at 400 MHz to compensate for the roll-off effect described earlier. The output of this circuit may be switched into an impedance termination of a 75-ohm resistor by a first/last bank detector 266 if the KVM unit 12 is the physical first or last unit in the chain. This signal is then distributed to the 4×1 multiplexed circuit 258 for selection to the OCC 22 and also to the bank-to-bank interconnect 20, preferably a 68 pin SCSI connector, used to distribute video bus signals to the other KVM units 13-15 within the system 10.

The 4 to 1 multiplexed circuit consists of another set of discrete RF switches 256. Each RGB bus set is again enabled by a control signal from the FPGA 219 of the master controller 215 and a negative voltage level-shifted, buffered set of gates controlled via an FPGA I/O pin. This particular set of control circuitry switches the raw computer video off while the KVM OSD circuitry is enabled. Along with the switched 4 to 1 output signal, the OSD controller 268 supplies another switchable signal output from the OSD that is presented in a mutually exclusive manner with the raw computer video. The OSD controller may be text based, for example a Mitsubishi #35070 device, or of a graphical, discrete IC design. This switched video signal feeds another set of peaking amplifiers 270 with an output enable function for driving RGB through a cable and ultimately to the OCC monitor 22. The output enable of this set of amplifiers is utilized in specific applications where the monitor may have video signals switched between two separate RGB signal sources.

The video path of the KVM unit 12 preferably includes a first/last bank detector 240 to automatically apply a terminating resistor to the RGB video signals of the video busses 238 if the KVM unit 12 is the first or last unit in the chain in order to maintain video quality in the system 10.

A fifth control bank signal 272 from the FPGA 219 to the video amplifier 270 allows for the blanking of the video during the switching of one selected host to another, thereby eliminating the garbled signals that the user might otherwise see while the monitor is re-synchronizing.

As mentioned above, the discrete RF switches 254 are configured into an 8×4 multiplexed circuit 232 in combination with output enable/disable high-speed video operational amplifying circuits 262. The number of circuits required by this multiplexer switch may be calculated by multiplying 3 (for the three video signals of R, G, and B) by the number of hosts and by the number of video busses. As shown in the preferred embodiment, there are ninety-six (96) switches in the 8×4 video switch 232, which is 3 colors×8 hosts×4 video busses. Alternate embodiments of the invention may have a different number of hosts or video busses.

Figure 4:
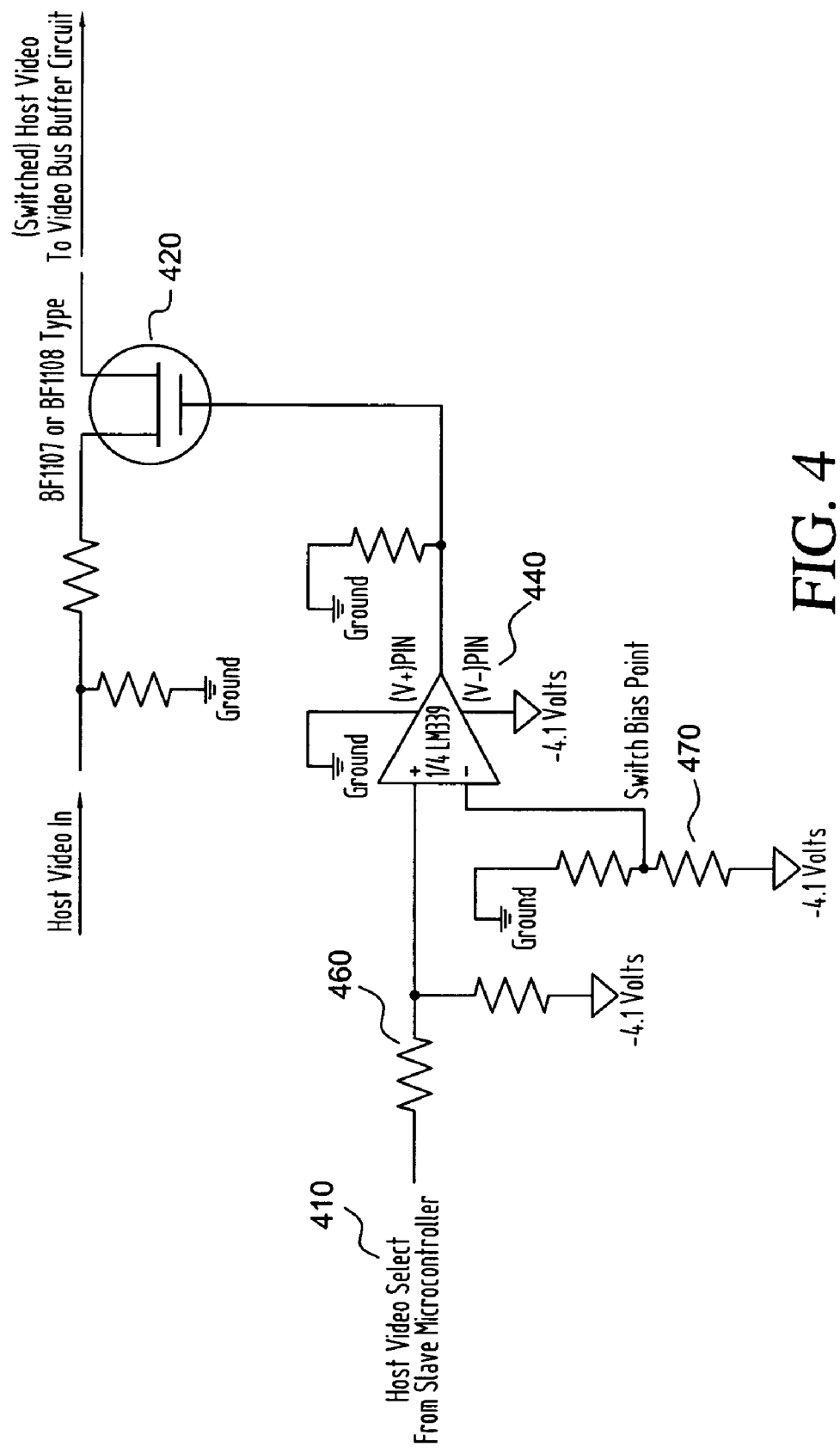
FIG. 4 shows a schematic drawing of the RF switch and drive circuitry of the 8×4 multiplexer of FIG. 3.

FIG. 4 shows the RF switch and drive circuitry of a single RF switch of the 8×4 video multiplexer 232 of FIG. 3. Referring to FIG. 4, a "Host Video Select" control signal 410 from the slave controller 201 is used to turn the RF switch on for multiplexing host video signals into the 8-by-4 multiplexer array. A negative voltage level-shifted, buffered set of gates is required to drive the discrete RF switch 420 due to the requirements of the RF device, which requires a voltage signal to the gate that is well below the switched signal voltage. The "Host Video Select" control signal 410 from the slave controller 221 goes "low" (logical "0" or in this case, or zero Volts) in order to turn the switch off. The "Host Video Select" control signal 410 is normally held "low," but will go "high" (logical "1", or about 3.3 Volts) when the host computer 71 is selected by the user at the OCC 22. In order to produce a proper drive signal to the gate of the RF switch 420, the "Host Video Select" control signal 410 must be voltage-level-shifted from the 0 Volts to 3.3 Volts level to a −4.1 Volts to 0 Volts level.

This voltage level shifting is accomplished by using the circuit shown in FIG. 4. The circuit includes a comparator 440, preferably a commercially available LM339 comparator. The LM339 comparator is the preferred device for the comparator because it is inexpensive, commonly available, and reliable for the intended purpose. The power supply pins of the comparator 440 are connected to 0 Volts and −4.1 Volts. The "Host Video Select" control signal 410 of the slave controller 221 is level-shifted at its output using the 180K-100K resistor divider 460 shown in FIG. 4. The tap of the resistor divider is connected to the (+) input of the comparator 440 and fluctuates between roughly −1.46 Volts and −2.64 Volts. The (−) input of the comparator 440 is connected to a signal level of −2.05 Volts which is derived from the tap of two 2.7K resistors 470. The "Host Video Select" control signal 410 and voltage divider 460 serve to toggle the (+) input pin of the comparator 440 about its switching point, causing the output of the comparator to toggle between −4.1 Volts (switch off) and 0 Volts (switch on).

The preferred embodiment of the present invention compensates for the connector roll-off by implementing a conventional peaking operational amplifying circuit to pre-emphasize only the video signals. Buffering for multi-bank systems is supplied to extend physical separation of units and maintain quality video. In addition Video buffering uses peaking circuits to maintain quality video.

Figure 5:
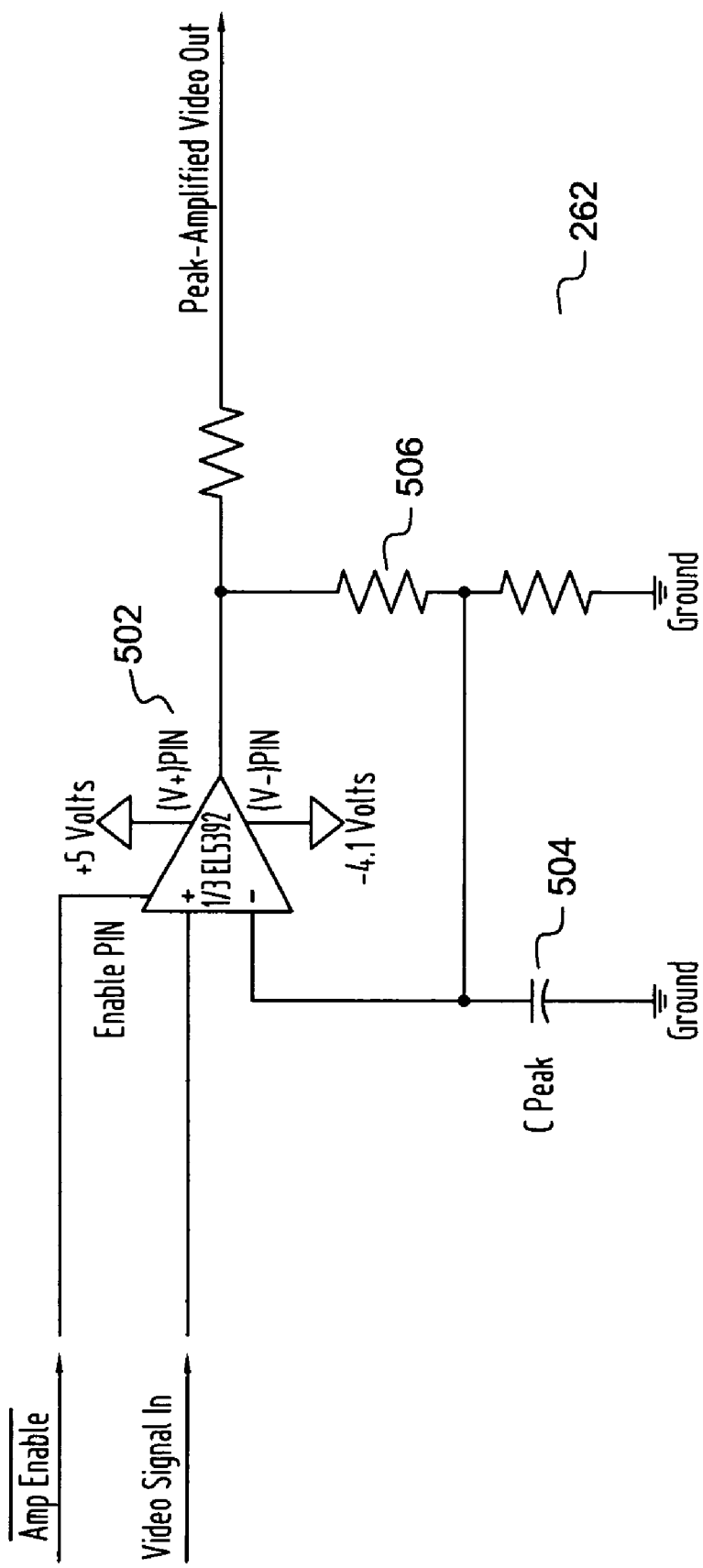
FIG. 5 shows a schematic drawing of the a peaking operational amplifying circuit of FIG. 3.

FIG. 5 shows the peaking amplifier circuit 262 of FIG. 3. The peaking amplifier 262 includes a Current Feedback Amplifier (CFA) device 502. Preferably, an EL5392 CFA manufactured by Elantec is used for the CFA 502. The technique used to configure the CFA 502 for a peaking amplifier is well understood in the art. A small value capacitor, such as the C Peak capacitor 504 depicted in FIG. 5, is added to the feedback loop of the circuit. This results in an increase in the amplification of the CFA 502 as signal frequencies increase. The 1K-10K resistors 506 in the feedback loop are provided to add a small amount of overall gain to the amplifier.

The EL5392 also contains a feature to allow the output of the CFA 502 to be disabled (that is, to go into a high impedance state). This feature is utilized to allow multiple CFA outputs to be connected together on the Video Bus with only one amplifier enabled at a time.

Figure 6:
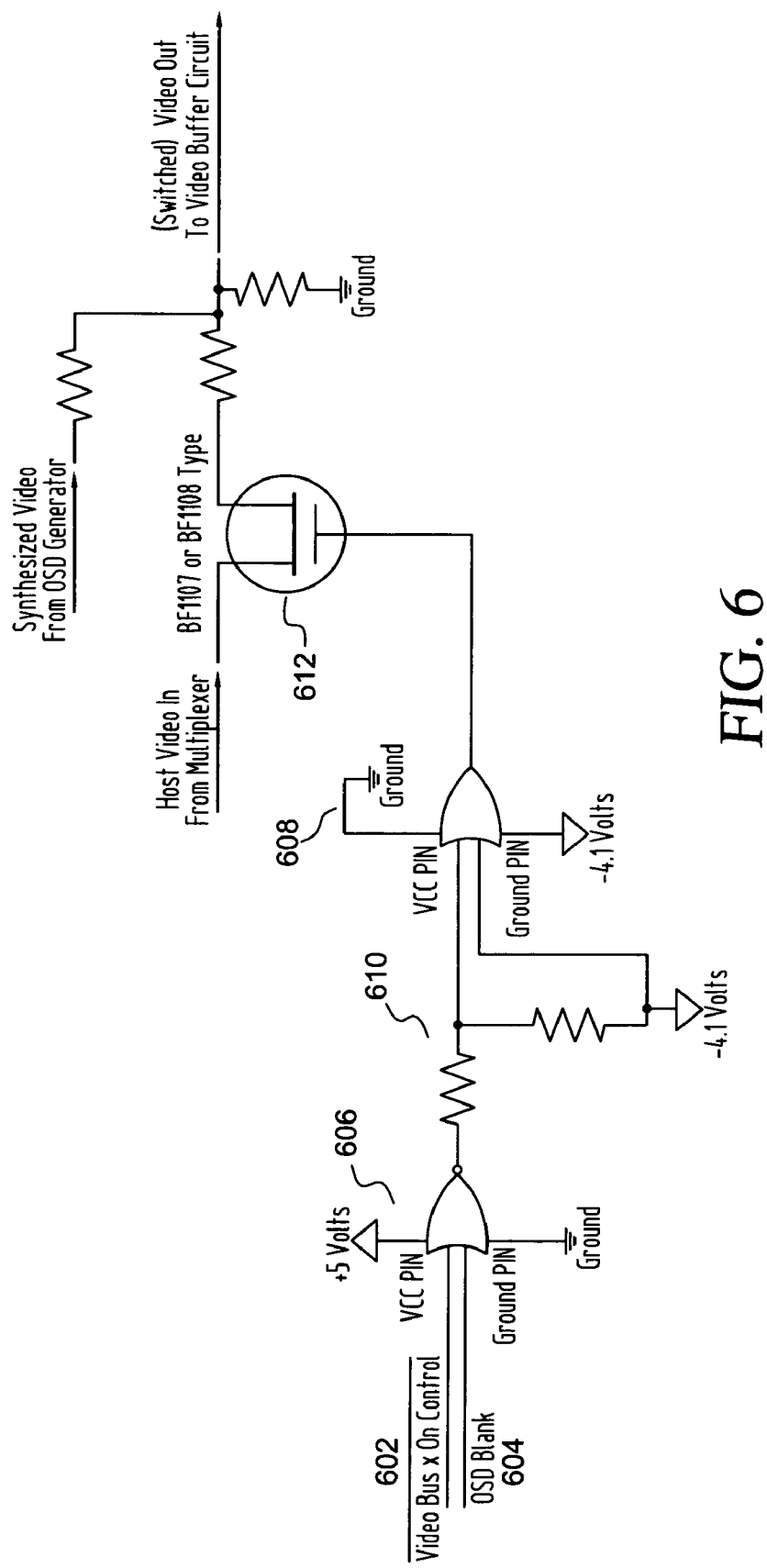
FIG. 6 shows a schematic drawing of the RF switch and drive circuitry of the 4×1 video bus selector and OSD switch of FIG. 3.

The OSD is displayed on the OCC monitor 30 by a switching method. As shown in FIG. 3, the present invention uses an additional switch 260 to "switch out/in" the host computer video data on a portion of a particular horizontal line while simultaneously "switching in/out" the OSD video data. In this manner, the raw computer data is completely switched off (removed) while the OSD data and banners are presented to the operator with its own colored background. When the On-Screen-Display (OSD) is enabled, the OSD circuit switches off the RGB video portion when the OSD is active, allowing the OSD user interface to be displayed on the OCC monitor. When the OSD is inactive, the selected host computer video is switched on for display on the OCC monitor 30. The HV portion of the focused RGBHV bus is made available through a programmable logic device (the FPGA 219 of FIG. 2) to synchronize the KVM OSD and host monitor video signals displayed on the OCC monitor 30. FIG. 6 shows a detailed schematic drawing of a single discrete RF switch and switch drive circuit of the 4×1 multiplexed circuit combination depicted in FIG. 3. A "Video On Control" signal 602 from the master controller 215 and an "OSD Blank" signal 604 from the OSD circuit 268 are inputs of a NOR gate 606 and control the switch. The NOR gate 606 is coupled to an OR gate 608 via a 2.4K-1K resistor divider network 610. The output of the OR gate 602 is coupled to the input gate of an RF switch 612.

The depletion mode MOSFET devices used as discrete RF switches in the preferred embodiment require that a voltage of roughly −4 Volts be supplied to the gate of the devices in order to turn the devices "off", i.e., to go into a high-resistance mode. However, when OSD video is to be displayed instead of video from the host computer, the RF switches need to be turned off and on at a very fast rate (on the order of 10 nanoseconds). This is accomplished using the NOR gate and OR gate combination shown in FIG. 6.

Video signals are displayed line by line. The video signals for each scan line may originate from the host computer video or a portion of the scan line may be part of the OSD display, which is synthesized video that originates from the OSD generator. For display of video signals originating from the host computer video, the Video On control signal 602 is used to turn the RF switch "on". Specifically, the Video On control signal 602 goes "low" (i.e., logical "0" or, as implemented here, zero Volts) in order to turn the RF switch "on". The OSD Blank signal is held "low".

When, during a scan line, the synthesized video from the OSD generator is to be displayed instead of the host video, the OSD Blank signal 604 will go "high" (i.e., logical "1", or approximately five (5) Volts) and then "low" again when the OSD portion of the scan line is finished. The NOR gate 606 is used to produce the proper logical levels which produce the function just described. The NOR gate device 606 is preferably a 74ACT02 device, which is common device available from a variety of manufacturers including Fairchild Semiconductor (e.g., the Fairchild 74ACT02SC or the Fairchild MM74AC32M) and Texas Instruments.

The discrete RF switch circuit 612 is designed to receive drive signals from −4.1 Volts to 0 Volts. Therefore, in order to produce the proper drive signal to the gate of the RF switch, the switch control signals must be voltage-level-shifted from the 0 Volts to 5 Volts level to a −4.1 Volts to 0 Volts level. The voltage-level shifting of the output of the NOR gate 606 is implemented using an OR gate 608, preferably a commercially available 74AC32 device. The output of the NOR gate 606 is level-shifted by the 2.4K-1K resistor divider 610. The tap of the resistor divider 610 fluctuates between roughly −1.42 Volts and −2.89 Volts. The 74AC32 devices of the preferred embodiment will reliably switch their outputs when their input levels transverse a voltage equivalent to roughly half their supply voltage, which in this case is −2.05 Volts. The first and second power supply pins of the OR gate 608 are connected to 0 Volts and −4.1 Volts, respectively. In the circuit combination shown in FIG. 6, the 2.4K-1K resistor divider 610 serves to shift the NOR gate 606 output voltage to a level which toggles the input pin of the OR gate 608 about its switching point of −2.05 Volts. Accordingly, the output of the NOR gate 606 is essentially amplified by the resistor divider 610 and OR gate 608 combination so as to drive the gate of the RF switch 612 to proper levels. The circuit of FIG. 6 uses the 74ACXX family of logic devices for four reasons: First, these devices are very fast, with a propagation delay of roughly 3 nanoseconds. Second, as mentioned above, they reliably switch at midway between the voltage rails of the VCC and Ground pins, which is important for proper operation of the circuit. Third, these are commonly available devices. Fourth, these are inexpensive devices.

The previously described embodiments of the invention have many advantages, including lower cost and higher resolution, with limited space. The KVM switch transfers video signals at approximately 400 MHz from the selected host computer to one of a plurality of OCC monitors. Higher video rates, including video rates of up to 2048×1536 resolution at approximately 85 Hertz (QXGA), are supported while maintaining quality video. The roll-off effect that occurs with video at higher speeds is compensated by operational amplifiers, thereby contributing to the crisp video quality. For video signals at higher speeds, the novel use of RF switches results in a simple and low cost solution. For video signals at this speed, and for allowing multiple video busses, the RF switches used conserve space as compared to alternative solutions such as RTL logic.

Although the present invention has been described in considerable detail with reference to certain preferred embodiments thereof, other embodiments are possible. For example, fewer or more video busses may be used and fewer or more hosts may be allowed per KVM unit. Therefore, the spirit and scope of the appended claims should not be limited to the description of the preferred versions contained herein.

What is claimed is:

1. A video switch for switching a video output of one of a plurality of computers to a target video destination capable of operating in accordance with a QXGA image resolution standard, the video switch comprising:
an integrated circuit comprising a microcontroller configured to emit two or more control signals;
a voltage converter having an input and an output, wherein a first video select signal of the two or more control signals is operably connected to the input of the voltage converter; and
a discrete radio frequency switch configured to switch at least a portion of the video output; the discrete radio frequency switch having a control terminal, a video input terminal and a video output terminal,
wherein at least a portion of the video output of the one of the plurality of computers is operably connected to the video input terminal of the discrete radio frequency switch,
wherein the output of the voltage converter is operably connected to the control terminal of the discrete radio frequency switch and controls a switching of the discrete radio frequency switch, and
wherein the discrete radio frequency switch is configured to operate at a frequency greater than 250 megahertz for enabling the QXGA image resolution standard.

2. The video switch of claim 1, wherein the voltage converter comprises a resistor divider operably connected to a logic device.

3. The video switch of claim 1, wherein the voltage converter comprises a resistor divider operably connected to a comparator comprising an operational amplifier.

4. The video switch of claim 3, wherein:
an output of the operational amplifier is operatively connected to the control terminal of the discrete radio frequency switch; and
the output of the operational amplifier comprises a range of between approximately −5 volts to approximately 0 volts and controls the switching of the discrete radio frequency switch.

5. The video switch of claim 1, wherein the discrete radio frequency switch is a depletion mode MOSFET device comprising a control terminal and actuatable with a negative voltage at the control terminal.

6. The video switch of claim 1, wherein:
the video switch is configured to operate the discrete radio frequency switch at approximately 388 megahertz.

7. The video switch of claim 1, wherein:
the microcontroller comprises a slave controller; and
the slave controller is coupled to a master controller comprising a field programmable gate array integrated circuit.

8. A video switch for switching a video signal of one of a plurality of computers to a target video destination capable of operating in accordance with a QXGA image resolution standard, the video switch comprising:
an integrated circuit configured to emit a video control signal;
an On Screen Display (OSD) video switch control circuit configured to receive the video control signal, the OSD video switch control circuit comprising:
a resistor divider network coupled between and in series with a first logic gate and a second logic gate;
the first logic gate having a video control input, an OSD control input, and a control output, the control output of the first logic gate having a first voltage level;
an input of the resistor divider network operably coupled to the control output of the first logic gate and receiving the first voltage level;
the second logic gate operably coupled to an output of the resistor divider network, the second logic gate having a control output, the control output of the second logic gate having a second voltage level; and
a discrete radio frequency switch operable at a frequency greater than 250 megahertz and having a control terminal, a video input and a video output,
wherein at least part of the video signal of one of the plurality of computers is operably connected to the video input of the discrete radio frequency switch, and
wherein the control output of the second logic gate is operably connected to the control terminal of the discrete radio frequency switch.

9. The video switch of claim 8, wherein the video output of the discrete radio frequency switch is operably connected to a peaking video amplifier circuit.

10. The video switch of claim 8, wherein:
the video switch is configured to operate the discrete radio frequency switch at approximately 388 megahertz.

11. The video switch of claim 8, wherein:
the first logic gate comprises a circuit configured to implement a logic NOR function; and
the second logic gate comprises a circuit configured to implement a logic OR function.

12. A video switch for connecting video signals of one of a plurality of computers to a target monitor capable of operating in accordance with a QXGA image resolution standard, said video switch comprising:
three sets of switch circuits for receiving red, green, and blue video signals of said plurality of computers respectively, each set of switch circuits comprising a plurality of discrete radio frequency switches; and
a control signal generating circuit comprising an integrated circuit configured to generate a plurality of host video select control signals,
each of said plurality of host video select control signals coupled to a corresponding voltage-level shifting circuit from the three sets of switch circuits,
an output of each voltage-level shifting circuit being used for controlling each corresponding discrete radio frequency switch in said three sets of switch circuits, and
each corresponding discrete radio frequency switch in said three sets of switch circuits is configured to operate at a frequency substantially greater than 250 megahertz for enabling the QXGA image resolution standard.

13. The video switch of claim 12, wherein:
the video switch is configured to operate the plurality of discrete radio frequency switches at approximately 388 megahertz.

14. A video switch for routing video data from a host computer to a target video destination in a KVM system, the video switch comprising:
a host computer port set comprising a first port configured to transmit a first video signal;
a master controller comprising one or more integrated circuits;
a first microcontroller coupled to the master controller and to the first port of the host computer port set;
a video multiplexer coupled to the first port of the host computer port set and to a microcontroller output of the first microcontroller, the video multiplexer comprising:
a multiplexer RF switch set having one or more radio frequency switches of the video multiplexer; and
a video bus selector coupled to the video multiplexer and configured to receive the first video signal from an output of the video multiplexer, the video bus selector comprising:
a bus selector RF switch set having one or more radio frequency switches of the video bus selector;
wherein the video switch is configured to support a frequency greater than 250 megahertz for the video data.

15. The video switch of claim 14, wherein:
the multiplexer RF switch set of the video multiplexer comprises:
a voltage level switching circuit comprising:
a comparator circuit; and
a first resistor divider comprising:
a first resistor divider input coupled to the microcontroller output of the first microcontroller; and
a first resistor divider output coupled to an input of the comparator circuit; and
a first RF switch comprising:
a first control terminal coupled to an output of the comparator circuit of the voltage level switching circuit;
a first video input terminal coupled to the first port and configured to receive the first video signal; and
a first video output terminal configured to transmit the first video signal through an output of the video multiplexer when the comparator circuit actuates the first control terminal to enable the first RF switch.

16. The video switch of claim 15, wherein:
the bus selector RF switch set of the video bus selector comprises:
a bus select logic circuitry comprising:
a second resistor divider coupled between and in series with a first logic device and a second logic device;
the first logic device comprising:
a video control input coupled to the master controller and configured to receive a video control signal from the master controller; and
an On Screen Display (OSD) control input to an OSD generator and configured to receive an OSD control signal from an OSD controller of the video switch;
the second resistor divider comprising:
a second resistor divider input coupled to an output of the first logic device; and
a second resistor divider output coupled to an input of the second logic device; and
a second RF switch comprising:
a second control terminal coupled to the second resistor divider output;
a second video input terminal configured to receive the first video signal from the output of the video multiplexer; and
a second video output terminal configured to transmit the first video signal through an output of the video bus selector when the bus select logic circuitry actuates the second control terminal to enable the second RF switch.

17. The video switch of claim 16, wherein:
the bus select logic circuitry is configured to disable the second RF switch when the OSD control signal is received by the first logic device.

18. The video switch of claim 16, wherein: the first logic device of the bus select logic circuitry comprises a logic NOR functionality.

19. The video switch of claim 1, wherein:
the first and second RF switches comprise a depletion mode MOSFET device.

20. The video switch of claim 14, wherein:
the video switch is configured to support a frequency of approximately 388 megahertz for the video data.

* * * * *

UNITED STATES PATENT AND TRADEMARK OFFICE
CERTIFICATE OF CORRECTION

PATENT NO.        : 7,631,337 B2
APPLICATION NO.   : 11/592048
DATED             : December 8, 2009
INVENTOR(S)       : King et al.

It is certified that error appears in the above-identified patent and that said Letters Patent is hereby corrected as shown below:

At column 12, line 27, insert the word --coupled-- between the words "input" and "to."

Signed and Sealed this

Thirtieth Day of March, 2010

David J. Kappos
*Director of the United States Patent and Trademark Office*